July 15, 1958 G. M. WILLIAMS 2,843,274
FLOW CONTROL BAFFLE FOR GRANULAR MATERIAL
Filed Nov. 4, 1955

INVENTOR
GAEL M. WILLIAMS
BY
ATTORNEYS

United States Patent Office 2,843,274
Patented July 15, 1958

2,843,274

FLOW CONTROL BAFFLE FOR GRANULAR MATERIAL

Gael M. Williams, Berkeley, Calif., assignor to California Research Corporation, San Francisco, Calif., a corporation of Delaware Application November 4, 1955, Serial No. 545,014

2 Claims. (Cl. 214—17)

This invention relates to an apparatus for controlling the gravity flow of granular or other fluent material through a chamber to provide a relatively uniform upper surface configuration with varying rates of flow, and particularly refers to the control of catalyst beads flowing from a cylindrical hopper or vessel to prevent surges in an associated reactor system such as is used for contact catalytic processing of petroleum and the like.

In a system of the type just mentioned, there may be a continuously moving mass of catalyst beads or particles at high temperatures, 800° F. or higher, which are contacted in suitable chambers or vessels with hydrocarbons at superatmospheric pressure to convert the higher-boiling fractions to lower-boiling hydrocarbons having desirable properties. Subsequently the particles flow out of the reactor chambers and are regenerated, as by burning off carbon and other contaminants, after which they are cycled through appropriate conveying and flow controlling apparatus to the reactors for reuse.

This invention is particularly applicable to a catalyst surge hopper in which the level is maintained at a desired height, as by level-responsive and flow control means operating on other parts of the circulating system, to provide a continuous gravity flow of catalyst beads or particles to a reactor. Desirably, the level is maintained substantially constant, but, due to changes in the circulating system, momentary or periodic changes in the level are sometimes unavoidable. Configuration, i. e., upward or downward coning of the particles in the storage hopper is also a characteristic which should be maintained as constant as possible, so that the level-responsive and controlling means will respond uniformly and accurately, without undesirable delays or surging.

These and other advantages have been secured by the present invention, which consists broadly in providing means in a storage hopper, surge tank, silo, or the like, through which substantially uniformly sized particles or fluent materials flow downwardly to a central outlet, which will take advantage of the natural slopes assumed by the material both at rapid flow rates and at rest to give the least changes in the level and configuration of the top or upper surface of the material, and which is effective to flow the particles toward and out of the outlet in a uniform manner. In its simplest form it comprises a central baffle supported and spaced above the outlet to prevent that material nearest the center of the chamber from flowing out at a higher rate than that adjacent to the chamber wall. In a cylindrical tank or chamber it may comprise a flat horizontal disk, with its periphery spaced from the walls a predetermined distance, according to criteria which will be explained in more detail below. Since the bottom of most storage chambers of this nature is conical and at an angle of about 30° to 45° to the horizontal, depending on the angle of repose α of the material handled, the baffle may similarly be conical. To avoid a dead space above the baffle, and to insure both a complete emptying of the particles from the chamber during shut-downs and a continuous discharge of smaller particles or fines which tend to accumulate in the center of such a chamber, the baffle may be provided with a central aperture, desirably of an area having a predetermined flow rate relation, for example, $\frac{1}{20}$ to $\frac{1}{40}$ of the rate of material passing through the annular area surrounding the periphery of the baffle around which the major downward flow occurs.

It is an object of this invention to provide an improved flow control means for particulate materials passing downwardly under the action of gravity to a central outlet of a catalyst surge hopper or storage chamber.

Another object is to provide a flow control means of the type described that will maintain a substantially unvarying configuration of the top surface of a body of particles accumulating in a storage chamber from a central discharge conduit, and being discharged from a central discharge opening at the bottom of the chamber.

Another object is to provide a fixed flow control means in a circulating catalyst system that will minimize surges of flow rate, temperature, and other physical conditions within the system.

Another object is to provide a fixed flow control means that will cooperate with a level indicator or controller in a circulating catalyst handling system, and will minimize the variations in flow of particles in a catalyst surge tank or hopper, so that more accurate inventory of the amount of catalyst in the system at a given time may be obtained.

These and other objects and advantages will be further apparent from the following description of a preferred embodiment of the invention, taken in connection with the accompanying drawing.

Figures 1, 2, 3:
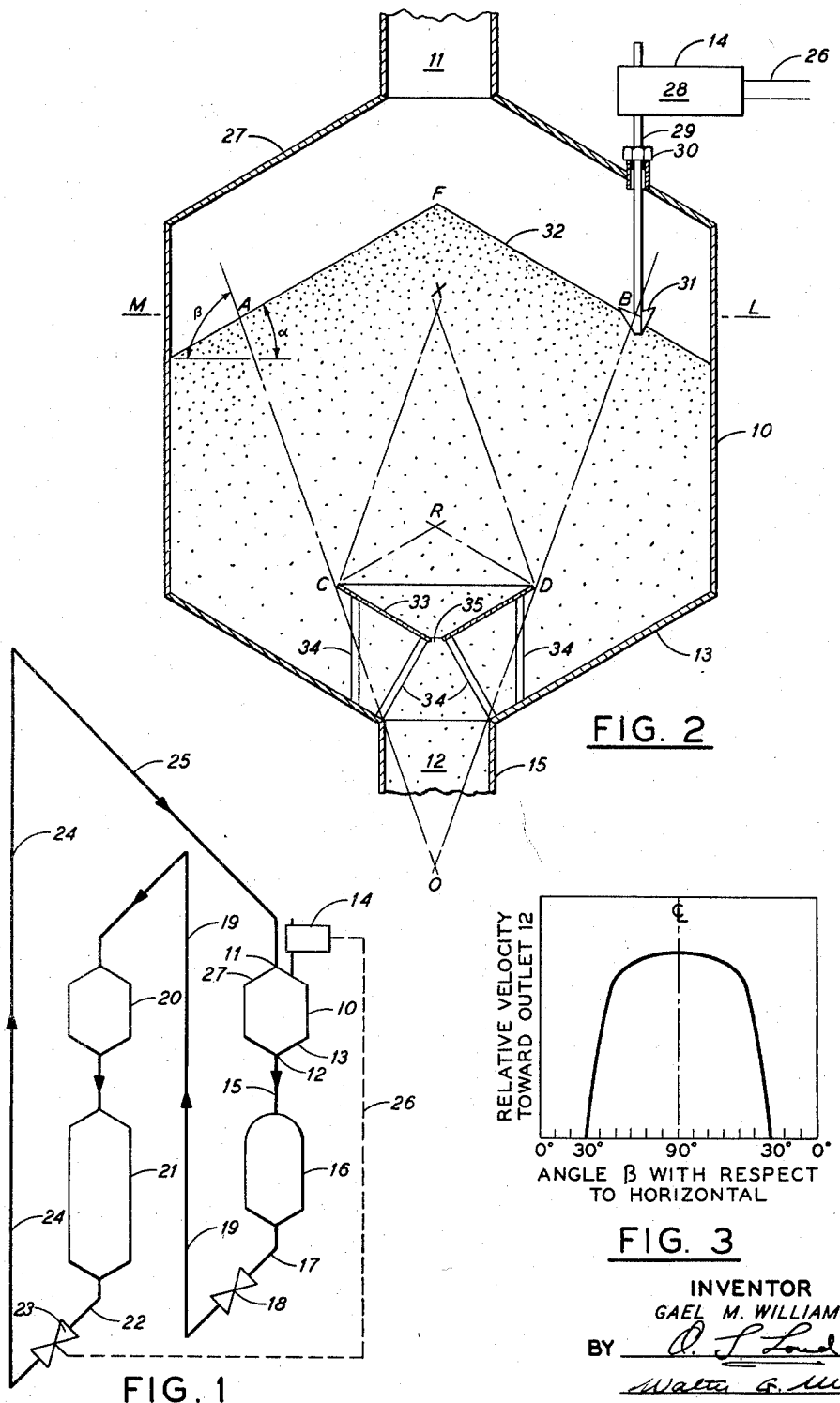
Figure 1 is a schematic diagram of a circulating catalyst system for petroleum processing, to which this invention is particularly adapted.
Figure 2 is a vertical sectional view of a catalyst hopper or storage chamber illustrating a typical installation of a baffle embodying the invention.
Figure 3 is a chart illustrating the relative velocity of downward flow toward the outlet of a cylindrical storage chamber with respect to the angle between the direction of flow and a horizontal plane.

Referring to Figure 1 of the drawing, reference numeral 10 designates generally a catalyst hopper chamber of a petroleum processing system, the hopper having an inlet 11 at the top, an outlet 12 at the lowest part of its conical bottom 13, and a level-responsive, remote-acting control means generally designated 14, the use of which will be described below. Conduit 15 leads from outlet 12 to a catalytic reaction chamber 16 of any suitable type, the internal arrangement being immaterial to the present invention. Generally speaking, it is desirable to feed catalyst uniformly, as by gravity flow, from hopper 10 to reactor 16, so that a substantially uniform level or head of catalyst in hopper 10 is advantageous.

From the bottom of reactor 16 catalyst is conveyed through a conduit 17 having a control valve 18 to an elevator 19, from the top of which it flows to a surge chamber 20 and thence into a regenerating kiln 21. From the bottom of kiln 21 the regenerated, hot catalyst passes through conduit 22 and valve 23 to another elevator 24, from the top of which it flows through conduit 25 to the inlet of hopper 10 to complete its cycle.

Elevator 24 operates at substantially constant speed, so that control of the level of catalyst in hopper 10 may be effected by connecting level-responsive control means 14 to valve 23 by a pneumatic transmission system, or by electrical means such as wires 26. This control, together with the separately adjustable valve 18, is usually considered to be adequate for the cyclically circulating catalyst particles or beads.

Referring now to Figure 2, which illustrates in detail the significant features of the invention, reference number 10 again designates generally the catalyst storage chamber or hopper, having a conical top 27 and a conical bottom 13, the latter communicating with the central outlet conduit 15. Level responsive means generally designated 14, in this example, includes a control box 28 from which there extends downwardly a shaft 29 through stuffing box 30 to terminate in a spinner 31. The shaft and spinner are rotated at uniform speed, and the configuration of the spinner is such that it assumes a position partly in and partly out of the mass of catalyst particles or beads 32, so that it follows changes in level thereof. Height-responsive means of any suitable type (not shown) in control box 28 transmit a signal through wires 26 to the control mechanism of valve 23 (Figure 1) to open or close the latter and maintain substantially constant the level of catalyst in chamber 10.

If catalyst hopper 10 were entirely empty of internal structures, and if the mean level of catalyst were at the horizontal plane ML, the catalyst in the center of the chamber immediately above the outlet would pass most rapidly to the outlet 12, while that outside of the conical space generally defined by the cone AOB would move substantially slower. The chart of Figure 3 illustrates this velocity-angular relationship more clearly, comparing the angle $\beta$ with flow velocity. Such a transversely non-uniform downward flow causes undesirable downward coning of the center of the top surface of catalyst particles 32 at times when withdrawal rates from chamber 10 are momentarily greater than those at which catalyst is added thereto by elevator 24 and conduit 25. When level-responsive means 14 attempts to correct this condition by opening valve 23 and increasing catalyst flow to elevator 24, the unavoidable time lag due to that required for a given increment of catalyst to move from valve 23 to hopper 10 is aggravated by the time required for the increased upward coning of catalyst at the center of hopper 10 to build up within the already deepened downward cone to the position of the level-responsive spinner 31. This results in momentary or more accurately periodic overfeeding and underfeeding of catalyst to hopper 10 which sets up surges in the moving catalyst system. It is impractical to face the level-responsive means 14 in the center of the chamber, due to the extremely rapid erosion of the parts 29 and 31 by the falling catalyst particles.

To correct this situation, a baffle member 33, in this example a conical member, is supported by a plurality of spaced legs 34 immediately above outlet 12, and at such a distance above the conical bottom 13 as not to restrict catalyst flow under its lower surface to outlet 12. The diameter of baffle member 33 is desirably such as substantially to intercept, intersect, or at least to approach the cone AOB, which is that enclosing substantially maximum flow rate of catalyst toward the outlet, in the absence of baffle 33. The base angle $\beta$ of this cone for this example is about 70°, as illustrated in Figures 1 and 3. This has sometimes been designated the dynamic angle of flow, as distinguished from the static angle of repose. The installation of this baffle has been found greatly to minimize the coning down of catalyst in the center of chamber 10; in fact, it may be operated to hold an upward cone at all times, so that level control means 14 responds more quickly to level changes and affords more uniform flow control of the catalyst in the entire system.

If baffle 33 were solid across its entire diameter, there would be retained upon its upper surface a "dead" volume of catalyst, represented by cone CRD, above which would be a more slowly moving mass represented by cone CXD.

Accordingly, it is contemplated that a small opening 35 should be made at the apex of baffle 33 to permit continuous downward flow of catalyst from immediately above the baffle into the uniformly moving mass of catalyst particles flowing inwardly beneath the baffle from the annular passage formed between its periphery and the wall of chamber 10. Although baffle 33 is illustrated as being conical and parallel to the bottom 13 of chamber 10, a flat plate could be substituted, with a corresponding minor disadvantage of retention of a small ring of catalyst upon its upper surface.

As an example of a certain installation of this invention, the catalyst chamber 10 was 12 ft. high and 18 ft. in diameter, with a 30° conical top and bottom, and a 3'—6" diameter outlet, handling spherical bead silica gel catalyst of about $\frac{3}{10}$ inch diameter at a rate of 450 tons per hour. Before this installation, the level control means 14 could not regulate the catalyst level without periodic surging of the catalyst flow that resulted not only in fluctuating temperatures in the system, but also required the maintenance of such a low level of catalyst in the hopper that attrition losses of catalyst, due to the free fall into the hopper, were very high. The 30° conical baffle 33 that was installed was 7 ft. in diameter and was spaced a vertical distance of about 3'—6" above the bottom cone 13 of the hopper 10. The central aperture 35 was 4 inches in diameter, and was designed to pass about 20 tons per hour directly to the outlet 12, the remaining 430 tons per hour passing around the periphery of the baffle 33.

In conclusion, it will be understood that, although this invention has been specifically described in connection with a catalytic petroleum cracking operation, handling particulate and usually spherical bead materials, it may also be applicable to other fields to use when its flow characteristics are desired. Also, although a single example of a satisfactory working structure is shown, changes and modifications could be made without departing from the essential features of the invention, and all such structures that fall within the scope of the appended claims are intended to be embraced thereby.

I claim:
1. A vertical surge tank for a catalyst circulating system, said tank having means therein responsive to the level of the upper surface of granular catalyst accumulated in said tank; said tank comprising a generally cylindrical wall portion, a top portion having an inlet for catalyst, a conical bottom portion having a central outlet for catalyst, and means for minimizing changes in configuration of the upper surface of said accumulated catalyst due to variable rates of flow in said circulating system which would otherwise affect adversely said level-responsive means, said last-named means consisting of a single circular baffle spaced above and coaxial with said outlet, said baffle being substantially parallel to the conical bottom of said tank and provided with a central aperture that is smaller in diameter than the tank outlet and effective to prevent those accumulated catalyst granules nearest the center of said tank from flowing toward said outlet and a higher rate than the accumulated granules nearest the wall of said tank.

2. A vertical surge tank according to claim 1, in which said baffle is of such outer diameter as to substantially intercept the conical surface which encloses the maximum flow rate of catalyst granules that would occur toward said outlet in the absence of said baffle.

References Cited in the file of this patent

UNITED STATES PATENTS

| | | |
|---|---|---|
| 2,634,842 | Caylor | Apr. 14, 1953 |
| 2,669,540 | Weinrich | Feb. 16, 1954 |
| 2,670,946 | Royster | Mar. 2, 1954 |
| 2,716,050 | Hagerbaumer | Aug. 23, 1955 |